United States Patent
Huang et al.

(10) Patent No.: US 9,690,321 B2
(45) Date of Patent: Jun. 27, 2017

(54) DISPLAY DEVICE HAVING DIFFERENT CURVATURE DESIGN

(71) Applicant: AU OPTRONICS CORPORATION, Hsin-Chu (TW)

(72) Inventors: Chi-Chen Huang, Hsin-Chu (TW); Ren-Mei Tseng, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/152,587

(22) Filed: May 12, 2016

(65) Prior Publication Data

US 2016/0334834 A1 Nov. 17, 2016

(30) Foreign Application Priority Data

May 12, 2015 (TW) .............................. 104115115 A

(51) Int. Cl.
*G06F 1/16* (2006.01)
*G02F 1/1333* (2006.01)

(52) U.S. Cl.
CPC ...... *G06F 1/1601* (2013.01); *G02F 1/133305* (2013.01)

(58) Field of Classification Search
CPC .... G06F 1/1601; G06F 1/1613; G06F 1/1637; G06F 1/1656; G02F 1/1333; G02F 1/133305; G02F 1/133308; G02F 1/133317
See application file for complete search history.

(56) References Cited

U.S. PATENT DOCUMENTS

| | | | | |
|---|---|---|---|---|
| 9,224,366 B1 * | 12/2015 | Park | ................... | H04N 13/0497 |
| 2009/0201443 A1 | 8/2009 | Sasaki et al. | | |
| 2013/0207946 A1 * | 8/2013 | Kim | ..................... | G09G 3/3225 345/204 |
| 2013/0321740 A1 | 12/2013 | An et al. | | |
| 2014/0306985 A1 * | 10/2014 | Jeong | ................... | G09G 3/3233 345/601 |
| 2016/0283014 A1 * | 9/2016 | Rider | .................... | G06F 1/1652 |
| 2016/0327987 A1 * | 11/2016 | Huitema | ............... | G06F 1/1652 |

FOREIGN PATENT DOCUMENTS

| | | |
|---|---|---|
| CN | 103424913 A | 12/2013 |
| TW | M497794 | 11/2014 |

OTHER PUBLICATIONS

Office Action issued in corresponding patent application in Taiwan.

* cited by examiner

*Primary Examiner* — Anthony Q Edwards
(74) *Attorney, Agent, or Firm* — McClure, Qualey & Rodack, LLP

(57) ABSTRACT

A display device includes a display panel having a first belt zone extending along a first side and a second belt zone extending along the first side and located at one side of the first belt zone opposite to the first side. The first belt zone has a first central part and a first inflexion part along an extending direction of the first side. The first central part and the first inflexion part are convex toward opposite directions. The second belt zone is bent in a manner different from the curvature distribution of the first belt zone.

13 Claims, 6 Drawing Sheets

DISPLAY DEVICE HAVING DIFFERENT CURVATURE DESIGN

BACKGROUND OF THE INVENTION

1. Field of the Invention

The present invention relates to a display device; particularly, the present invention relates to a display device having different curvature design.

2. Description of the Prior Art

With the development of the display technique, in addition to improving size and display quality, the appearance of display devices is also changed, such as curvature display devices. Comparing to planar type display devices, curvature display devices not only can be produced to have a larger size under the same width, but also can provide better viewing effect. For example, a TV screen can be produced in a concave shape, so that when users are watching TV, difference among distances from eyes to every location on a concave shaped TV screen is smaller than difference among distances from eyes to every location on a planar type TV screen. Each part of the display surface of a curvature TV connects line of sight at right angle or near right angle, forming the best viewing angle. Besides, the area of a curvature screen is larger than that of a planar screen under the same screen width, so that users can have a wider image.

Curvature displays can be made by utilizing an active lighting element (such as organic light emitting diode panels) or a passive lighting element (such as liquid crystal display panels). For traditional curvature display devices, when the liquid crystal panel is utilized to produce the curvature display, the liquid crystal panel is bent by an external force to form a curvature shape; however, the liquid crystal panel may have an uneven force distribution, generating stress-optical effect. Particularly, because stress is applied to the curvature shape of the display panel, refraction index along the maximum principal stress direction and that along the minimum principal stress direction are different, so that a slight phase difference exists between the maximum principal stress direction and the minimum principal stress direction when light passes through the display panel, and thus polarizer(s) cannot completely perform filtration, generating dark state light leakage. Because stress distribution is uneven on every part of the display panel, the amount of phase retardation on every part of the display panel is different, and the amount of light leakage on every part of the display panel is also different, resulting in uneven light leakage. Therefore, the structure of curvature display devices needs to be improved.

SUMMARY OF THE INVENTION

It is an object of the present invention to provide a display device which can improve a dark state light leakage in a display device designed in a curved shape.

The display device includes a display panel having a first belt zone extending along a first side and a second belt zone extending along the first side and located at one side of the first belt zone opposite to the first side. The first belt zone has a first central part and a first inflexion part along an extending direction of the first side. The first central part and the first inflexion part are convex toward opposite directions. The second belt zone is bent in a manner different from the curvature distribution of the first belt zone. By the design of different curvatures, the dark state light leakage problem in the display device due to uneven stress distribution can be avoided.

DETAILED DESCRIPTION OF THE PREFERRED EMBODIMENT

The present invention provides a display device having a curve shaped display panel. The display panel has different bending directions at a central part and an outer part. The display device of the present invention is preferably utilized in television, but not limited to. The display device can also be utilized in a game console, wearable devices, or other electronic devices.

Figure 1A:
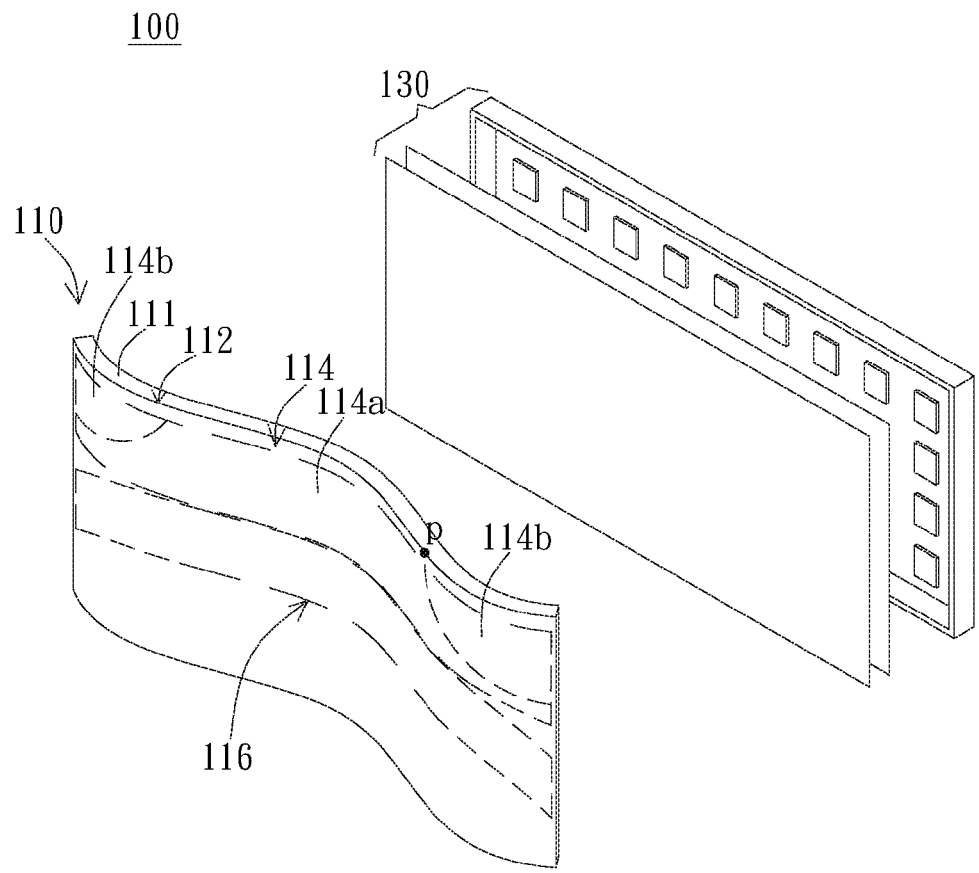
FIG. 1A is an exploded view of an embodiment of a display device of the present invention.

FIG. 1A is an exploded view of an embodiment of a display device 100 of the present invention. As shown in FIG. 1A, the display device 100 includes a display panel 110 and a backlight module 130. In this embodiment, the display panel 110 is a liquid crystal display panel, and the backlight module 130 is disposed at the backside of the display panel 110 to provide light entering into the display panel 110 and generate image. The display panel 110 has a first side 112 and an edge surface 111 along the first side 112. As shown in FIG. 1A, the display panel 110 is formed in a curved shape having different convex directions. When viewing from the edge surface 111, the side view of the display panel 110 has a wave-like shape.

Figure 1B:
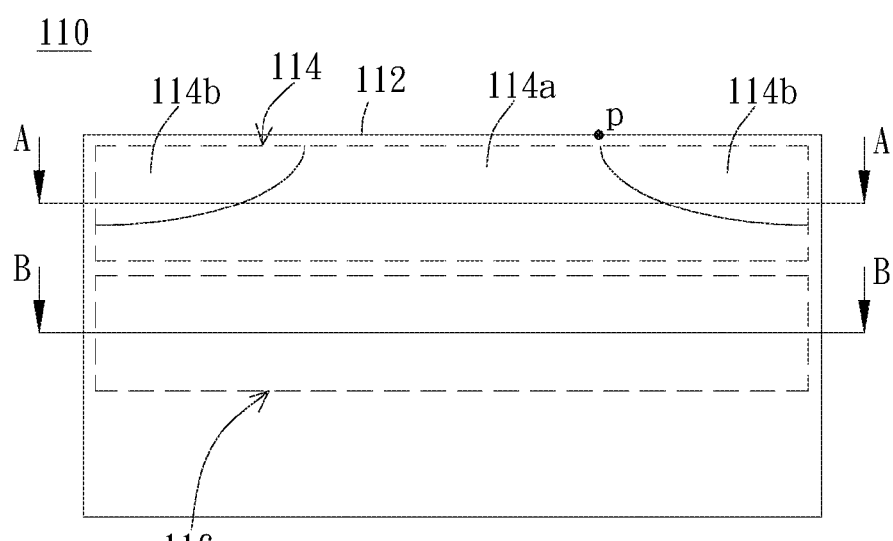
FIG. 1B is a front view of an embodiment of the display panel.

A first belt zone 114 and a second belt zone 116 are distributed on the display panel 110. The first belt zone 114 extends along the first side 112 and preferably traverses from one end of the display panel 110 to the other end of the display panel 110 along the first side 112. The second belt zone 116 extends along the first side 112 and is located at one side of the first belt zone 114 opposite to the first side 112 and also preferably traverses from one end of the display panel 110 to the other end of the display panel 110 along the first side 112. When viewing from the front side of the display panel 110, please refer to FIG. 1B, the first belt zone 114 has a first central part 114a and a first inflexion part 114b along an extending direction of the first side 112. The first side 112 and a border between the first central part 114a and the first inflexion part 114b intersect at an inflexion point (p). The first central part 114a and the first inflexion part 114b are convex toward opposite directions. It is noted that, though the dotted frame of the first belt zone 114 is separated from the first side 112, the dotted frame of the first belt zone 114 can extend to corresponding sides of the display panel 110. For example, the boundary of the first belt zone 114 covers the first side 112 (i.e. the first side 112 is a side of the first belt zone 114).

Figure 2A:
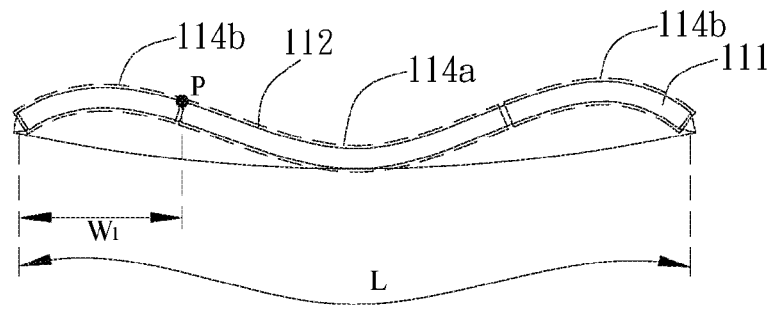
FIGS. 2A to 2C are cross-sectional views of the display panel at different positions parallel to a first side.
Figure 2B:
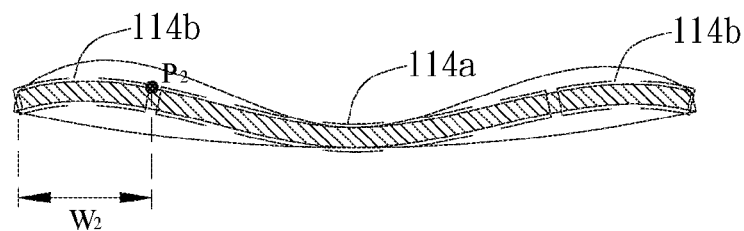
Figure 2C:
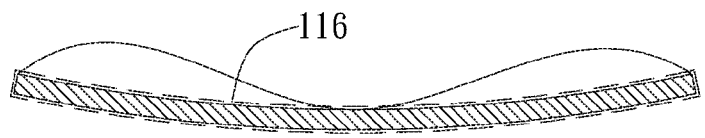

On the other hand, the second belt zone 116 is bent in a manner different from the curvature distribution of the first belt zone 114. For example, in the embodiment illustrated in FIG. 1A, the whole second belt zone 116 is convex toward the same direction as the first central part 114a. Please refer to cross-sectional views of the display panel at different positions parallel to a first side illustrated in FIGS. 2A to 2C. FIG. 2A is related to the cross-sectional view at the edge surface 111 (referring to FIG. 1A); FIG. 2B and FIG. 2C are related to cross-sectional views along line AA (referring to FIG. 1B, which generally corresponds to the center of the first belt zone) and along line BB (generally corresponding to the center of the second belt zone), respectively. As shown in FIG. 2A, the display panel 110 is hunched up at the first inflexion part 114b (if the surface near the first side is taken as the display surface, the display panel is hunched toward the display direction), and is convex toward opposite direction at the first central part 114a. Besides, the degree of bending of the first central part 114a is preferably larger than the degree of bending of the first inflexion part 114b. In other words, the curvature radius of the first central part 114a is smaller than that of the first inflexion part 114b. It is appreciated that the curvature may have positive or negative value with different bending directions, and the absolute value of the curvature radius is adopted while comparing the degree of bending mentioned in the context. In addition, because the curvature at each position of the first central part 114a and the first inflexion part 114b may be different, the degree of bending and the curvature radius mentioned in the context are preferably referred to an averaging result (e.g. average curvature radius). In FIG. 2B, the degree of bending of the first central part 114a and that of the first inflexion part 114b gradually become flatter. In FIG. 2C, the second belt zone 116 is in form of a concave upward shape, and the whole second belt zone 116 is convex toward the same direction as the first central part 114a. The uneven stress distribution in the curvature display panel can be relieved and the light leakage problem can be improved by the design of forming different curvatures and opposite convex directions at the central area and two sides of the central area of the first belt zone 114, decreasing curvature as a distance to the first side 112 increases, and adopting a different curvature distribution in the second belt zone 116.

In particular, the degree of bending of the display panel 110 becomes gradually flatter at the first central part 114a and the first inflexion part 114b from the position shown in FIG. 2A to the position shown in FIG. 2B. The border between the first central part 114a and the first inflexion part 114b moves from the inflexion point (p) toward the outer side of the display panel 110 and arrives at the inflexion point ($p_2$). As shown in FIG. 2A and FIG. 2B, in the first inflexion part 114b, the distance from an end portion of the display panel to the inflexion point ($p/p_2$) is shortened from a width ($w_1$, see FIG. 2A) to the width ($w_2$, see FIG. 2B). In other words, the width of the first inflexion part 114b in a direction parallel to the first side 112 decreases as a distance to the first side 112 increases. From a measured result, it is found that around 68%~79.6% of the amount of light leakage can be eliminated when a distance between the inflexion point and the end portion of the first inflexion part 114b on the first side 112 is not smaller than one-twelfth of a total length of the first side 112 and is not larger than one-fourth of the total length of the first side 112. In other words, the width of the first inflexion part 114b on the first side 112 has the following relation:

$$(1/4)L \geq w_1 \geq (1/12)L,$$

wherein L is the total length of the first side; w1 is the distance from the inflexion point (p) to the end surface on the first side. By this design, as the distance to the first side 112 increases, the first belt zone 114 may still have opposite convex directions to further eliminate dark state light leakage in the display device.

Figure 3A:
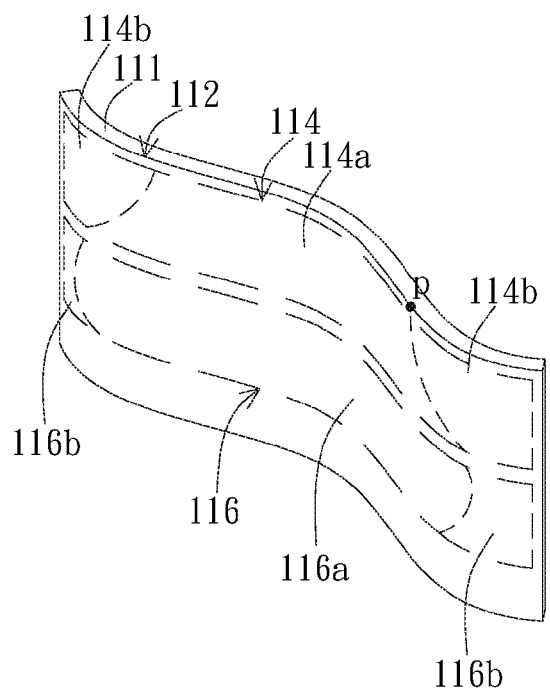
FIG. 3A is a perspective view of a different embodiment of a display panel.
Figure 3B:
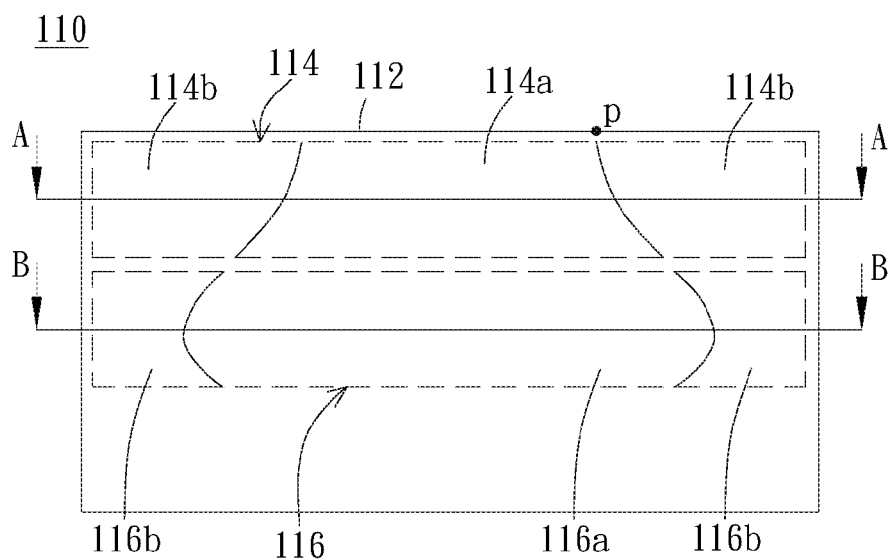
FIG. 3B is a front view of the embodiment of the display panel corresponding to FIG. 3A.

FIG. 3A is a perspective view of a different embodiment of a display panel 110. As shown in FIG. 3A, the first belt zone 114 and the second belt zone 116 are distributed on the display panel 110. Please refer to FIG. 3B, the first belt zone 114 has the first central part 114a and the first inflexion part 114b along the extending direction of the first side 112 on the surface of the display panel 110. Similarly, the second belt zone 116 has a second central part 116a and a second inflexion part 116b along the extending direction of the first side 112 on the surface of the display panel 110. Specifically, the second central part 116a is correspondingly adjacent to the first central part 114a. The second inflexion part 116b extends from the second central part 116a to be correspondingly adjacent to the first inflexion part 114b.

Figure 4A:
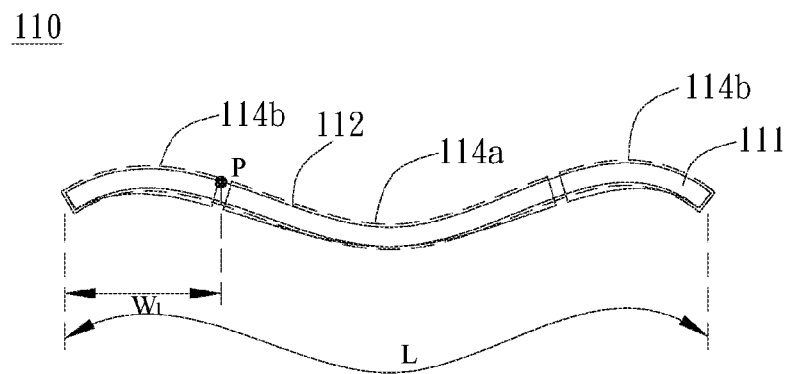
FIGS. 4A to 4C are cross-sectional views of the display panel at different positions parallel to a first side.
Figure 4B:
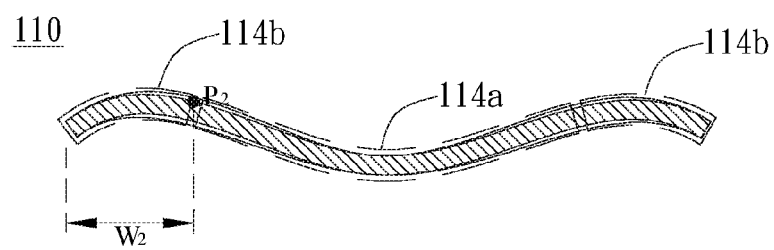
Figure 4C:
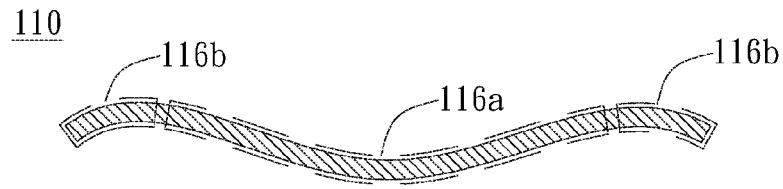

The difference between the embodiment of FIG. 1A and this embodiment is that, in the embodiment illustrated in FIG. 3A, the second central part 116a and the second inflexion part 116b are convex toward opposite directions. Please refer to cross-sectional views of the display panel 110 at different positions parallel to a first side 112 illustrated in FIGS. 4A to 4C. FIG. 4A is related to the cross-sectional view at the edge surface 111 (referring to FIG. 3A); FIG. 4B and FIG. 4C are related to cross-sectional views along line AA (referring to FIG. 3B, which generally corresponds to the center of the first belt zone) and along line BB (generally corresponding to the center of the second belt zone), respectively. As shown in FIG. 4A, the display panel 110 is hunched up at the first inflexion part 114b (if the surface near the first side is taken as the display surface, the display panel is hunched toward the display direction), and is convex toward opposite direction at the first central part 114a. Besides, the degree of bending of the first central part 114a is preferably larger than the degree of bending of the first inflexion part 114b. In other words, the curvature radius of the first central part 114a is smaller than that of the first inflexion part 114b. In FIG. 4B, the degree of bending of the first central part 114a and that of the first inflexion part 114b gradually become flatter. In FIG. 4C, the second central part 116a and the second inflexion part 116b of the second belt zone 116 are still convex toward opposite directions, but has a degree of bending much flatter than the degree of bending of the first central part 114a and the first inflexion part 114b along line AA. Besides, the width of the first inflexion part 114b decreases as the distance to the first side 112 increases. As shown in FIG. 4A and FIG. 4B, the inflexion point (p) moves toward the outer side of the display panel 110 as the distance to the first side 112 increases. The distance from the end portion of the display panel 110 to the inflexion point ($p/p_2$) is shortened from a width ($w_1$, see FIG. 4A) to the width ($w_2$, see FIG. 4B). From a measured result, it is found that when the width of the first inflexion part 114b on the first side 112 satisfies the relation mentioned above, the stress distribution in the display panel 110 can reduce the stress-optical effect, and the dark state light leakage can be eliminated.

As shown in FIG. 4A and FIG. 4C, for the first inflexion part 114b and the second inflexion part 116b, on a cross section parallel to the first side 112, an average curvature radius of the first inflexion part 114b is smaller than an average curvature radius of the second inflexion part 116b. In other words, the surface from the first inflexion part 114b extending to the second inflexion part 116b has variable curvatures, and the degree of bending of the first inflexion part 114b is larger than that of the second inflexion part 116b. By the design of forming opposite convex directions and changing curvature distribution in the first belt zone 114 and the second belt zone 116, the uneven stress distribution in the traditional curvature display panel can be improved for decreasing light leakage.

Figure 5:
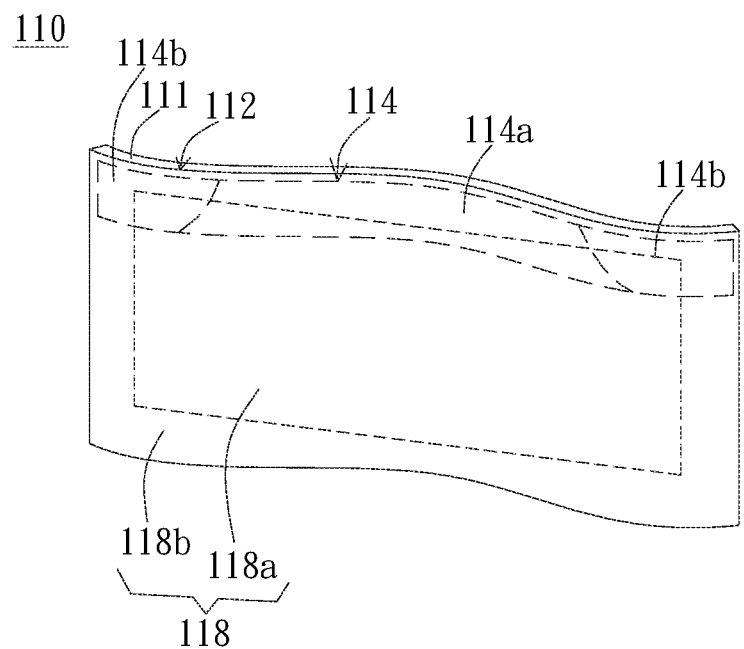
FIG. 5 is a schematic view of the relative position of a first belt zone of the display panel and a display surface.

FIG. 5 is a schematic view of the relative position of a first belt zone 114 of the display panel 110 and a display surface 118. As shown in FIG. 5, the display panel 110 has the display surface 118, wherein the display surface 118 includes a display area 118a and a peripheral strip 118b encircling the display area 118a. For the display surface 118a, the first belt zone 114 at least partially overlaps the display area 118a (i.e. the first belt zone extends into the range of the display area 118a). The ratio of the overlapping area of the first belt zone 114 and the display area 118a to the whole display area 118a can be adjusted depending on requirements. By the partially overlapping design of the first belt zone 114 and the display area 118a, the dark state light leakage around the display area 118a and corners can be avoided. It is noted that in the display panel 110 mentioned above, the display surface 118 is located at one side of the display panel 110 where the first inflexion part 114 is convex toward, but it is not limited to. In other embodiments, the display surface 118 can be located on different surfaces of the display panel 110 based on different display devices (such as a transparent display). For example, the display surface 118 is located at one side of the display panel 110 opposite to the side where the first inflexion part 114 is convex toward.

Figure 6:
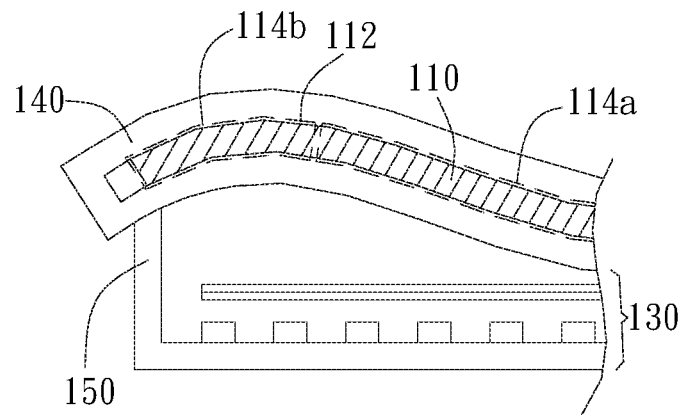
FIG. 6 and FIG. 7 are schematic views of the display device formed in a curved shape by different fixation methods.

FIG. 6 is a schematic view of the display device 100 formed in a curved shape by an outer restraint. As shown in FIG. 6, the display device 100 includes an outer frame 140 encircling the display panel 110. A middle section and an end section of the first side 112 are restrained to be convex toward different directions by the outer frame 140 to form the first central part 114a and the first inflexion part 114b, respectively. In particular, an upper position and a lower position of the display panel 110 are restrained by the outer frame 140, so that the display panel 110 has a shape much curving at the first belt zone and a gentle curved shape at the second belt zone as mentioned above. In other words, by utilizing the outer frame, the first belt zone is convex toward opposite directions, and the curvature of the second belt zone gradually decreases as a distance to the first side increases.

Figure 7:
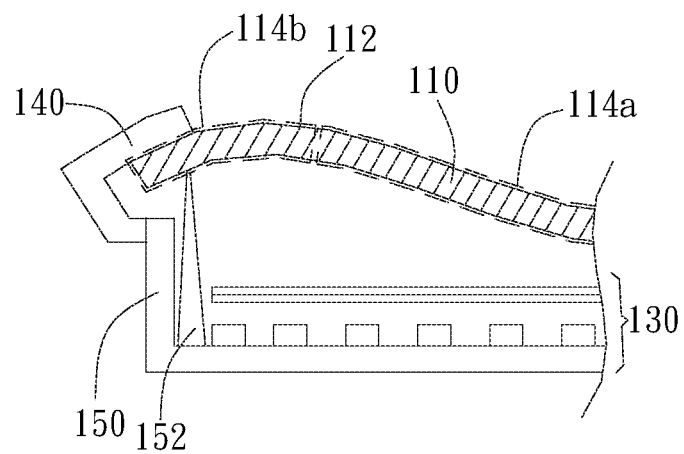

FIG. 7 is a schematic view of the display device 100 formed in a curved shape by another outer restraint. As shown in FIG. 7, the display device 100 includes a rear cover 150 disposed at a back side of the display panel 110. A pin 152 is disposed on the rear cover 150. The pin 152 supports the back side of the first inflexion part 114b to push and bend the first inflexion part 114b outward (convex toward the outer frame 140). Therefore, the display panel is bent to be convex toward opposite directions. In another embodiment, the aforementioned pin can changed as an inner frame supporting the display panel. The inner frame and the outer frame together clamp and bend the first inflexion part, so that the first inflexion part is bent to be convex toward opposite directions. To sum up, the display device of the present invention can utilize different fixation methods, so that the display panel is bent to have different convex directions and different curvatures to achieve the effect of improving the dark state light leakage in the display device.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A display device, comprising:
    a display panel having:
        a first side;
        a first belt zone extending along the first side, wherein the first belt zone has a first central part and a first inflexion part along an extending direction of the first side, the first central part and the first inflexion part are convex toward opposite directions; and
        a second belt zone extending along the first side and located at one side of the first belt zone opposite to the first side;
    wherein the second belt zone is bent in a manner different from a curvature distribution of the first belt zone.

2. The display device of claim 1, wherein the whole second belt zone is convex toward the same direction as the first central part.

3. The display device of claim 1, wherein the second belt zone comprises:
    a second central part correspondingly adjacent to the first central part; and
    a second inflexion part extending from the second central part to be correspondingly adjacent to the first inflexion part,
    wherein the second central part and the second inflexion part are convex toward opposite directions, an average curvature radius of the first inflexion part is smaller than an average curvature radius of the second inflexion part on a cross section parallel to the first side.

4. The display device of claim 1, wherein on a cross section parallel to the first side, an average curvature radius of the first central part is smaller than an average curvature radius of the first inflexion part.

5. The display device of claim 1, wherein a width of the first inflexion part in a direction parallel to the first side decreases as a distance to the first side increases.

6. The display device of claim 1, wherein the first side is formed as one side of the first belt zone.

7. The display device of claim 6, wherein the first side and a border between the first central part and the first inflexion part intersect at an inflexion point, a distance between the inflexion point and an end portion of the first inflexion part on the first side is not smaller than one-twelfth of a total length of the first side.

8. The display device of claim 7, wherein the distance between the inflexion point and the end portion of the first inflexion part on the first side is not larger than one-fourth of the total length of the first side.

9. The display device of claim 6, further comprising an outer frame encircling the display panel, a middle section and an end section of the first side being restrained to be convex toward different directions by the outer frame to form the first central part and the first inflexion part, respectively.

10. The display device of claim 9, further comprising an inner frame supporting the display panel, wherein the inner frame and the outer frame together clamp and bend the first inflexion part.

11. The display device of claim 1, further comprising a rear cover disposed at a back side of the display panel, wherein a pin is disposed on the rear cover; the pin supports a back side of the first inflexion part to push and bend the first inflexion part.

12. The display device of claim 1, wherein the display panel has a display surface, the display surface comprises:
 a display area; and
 a peripheral strip encircling the display area;
 wherein the first belt zone at least partially overlaps the display area.

13. The display device of claim 12, wherein the display surface is located at one side of the display panel where the first inflexion part is convex toward.

* * * * *